May 23, 1933.  W. H. WORTHINGTON  1,910,272
TILTING SUPPORT FOR COMBINE HARVESTING UNIT
Filed Nov. 15, 1929  4 Sheets-Sheet 1

INVENTOR
Wayne H. Worthington
By Arthur C. Donn
ATTORNEY

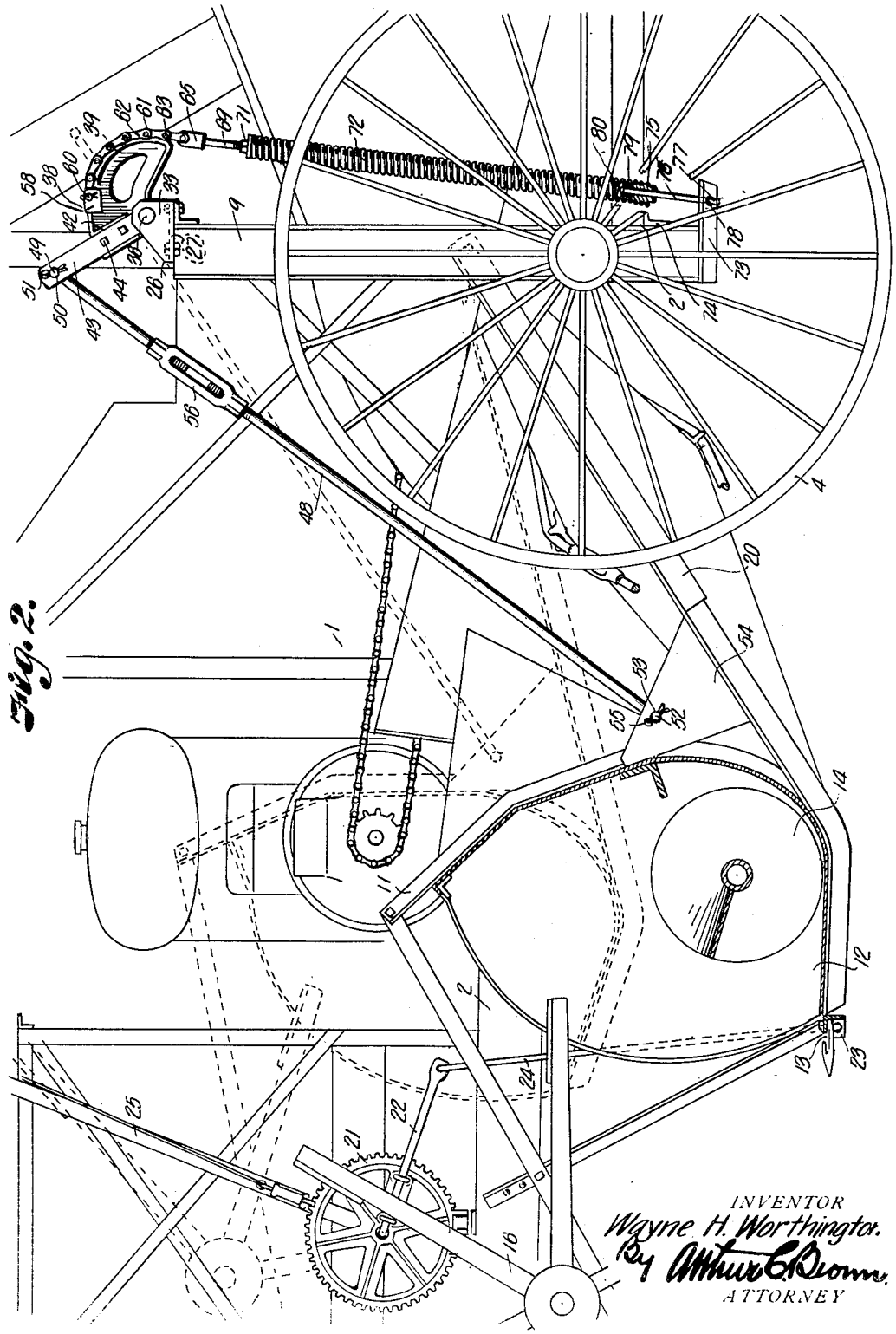

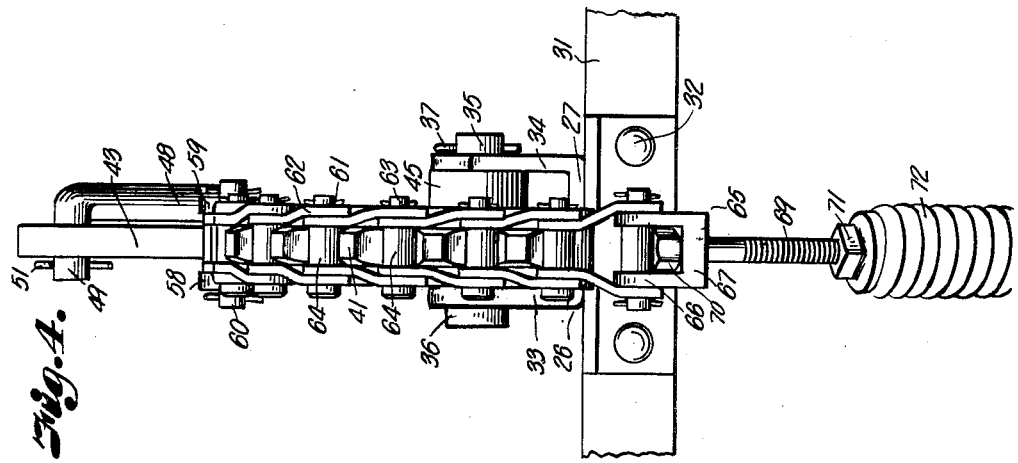

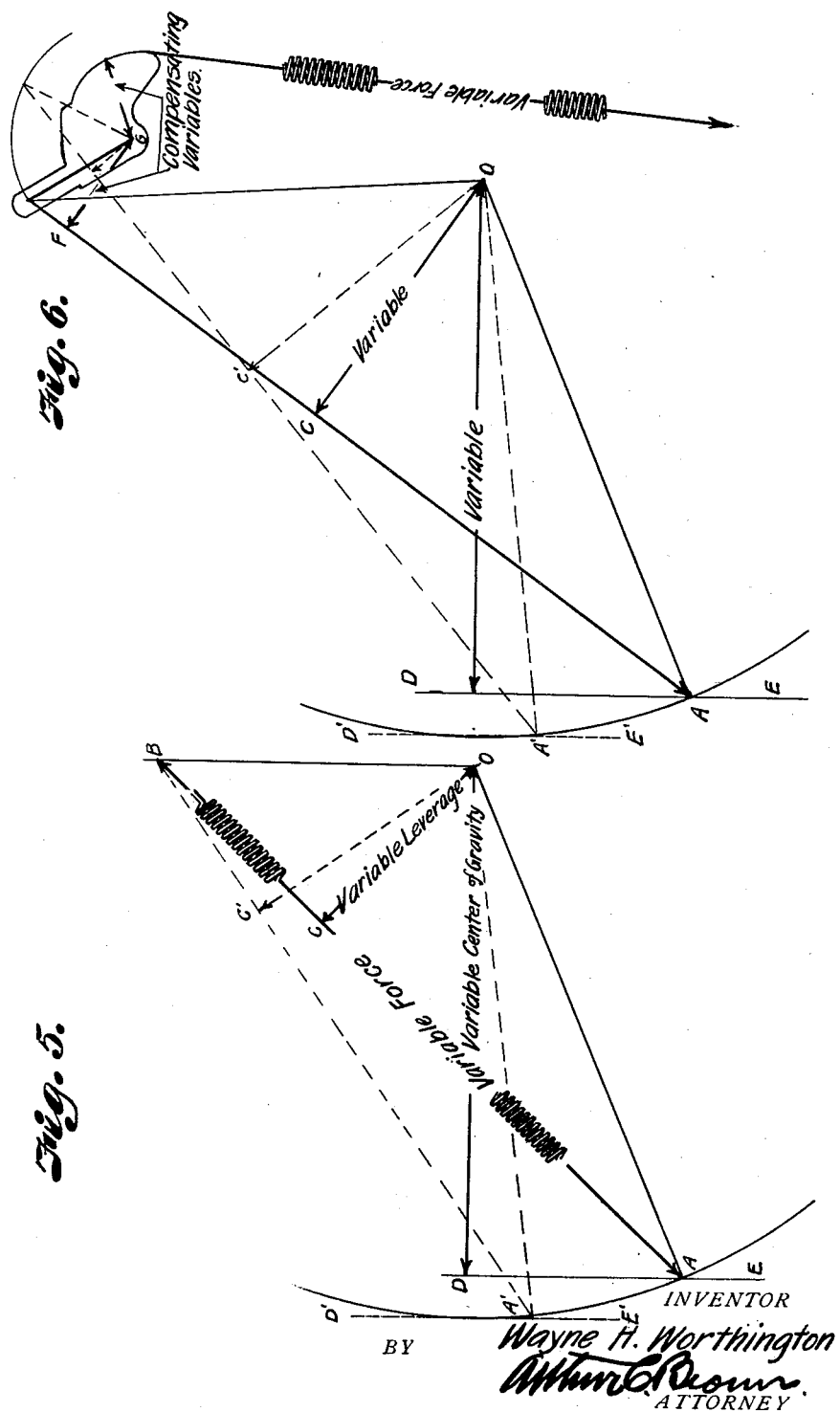

Patented May 23, 1933

1,910,272

UNITED STATES PATENT OFFICE

WAYNE H. WORTHINGTON, OF INDEPENDENCE, MISSOURI, ASSIGNOR, BY MESNE ASSIGNMENTS, TO GLEANER HARVESTER CORPORATION, OF INDEPENDENCE, MISSOURI, A CORPORATION OF DELAWARE

TILTING SUPPORT FOR COMBINE HARVESTING UNIT

Application filed November 15, 1929. Serial No. 407,389.

This invention relates to harvesting machines, and more particularly to means for balancing the harvesting or cutting unit of a combined harvester, thresher and separator of the type illustrated in Letters Patent No. 1,702,323, dated February 19, 1929.

In combines of the character described in the above mentioned patent, the cutting mechanism is pivotally suspended from the main frame of the machine, and the cutting unit is supported and balanced by spring tension to assist the operator in regulating the cutting unit with relation to the crop being harvested. The cutting unit is elevated and lowered by a lever with or against tension of the springs, and the cutting mechanism moves in an arc generated from its pivotal connection with the main frame. Consequently, not only center of gravity of the unit shifts to and from the fulcrum during its travel but the moment of counterbalance force also varies due to the changing angularity of the springs; also the tension of the springs constantly varies according to their degree of extension, which results in three irregularly varying factors. Thus the cutting unit may be perfectly balanced by the springs in one of its positions but as soon as the unit is shifted, these varying factors come into play to vary the balance, requiring effort on the part of the operator to move the unit throughout all of its other positions. It is, therefore, the principal object of this invention to provide for stabilizing balance of the cutting unit through all of its various positions, whereby the cutting mechanism may be easily and quickly regulated to the height of the crop being harvested with a minimum of effort on the part of the operator.

In accomplishing this and other objects of the invention, I have provided improved details of structure, the preferred form of which is shown in the accompanying drawings, wherein:

Fig. 2 is a longitudinal sectional view through the combine adjacent the outer side of the grain wheel.

Fig. 3 is an enlarged elevational view of one of the leverage compensating cams for varying tension of a balancing spring, parts of which are shown in section to better illustrate their construction.

Fig. 4 is an end elevational view of the operating cam and its related parts.

Fig. 5 is a diagrammatic view illustrating variable forces encountered in balancing the cuttting unit.

Fig. 6 is a similar diagrammatic view illustrating the variable forces and the compensating force for maintaining balance.

Figure 1:
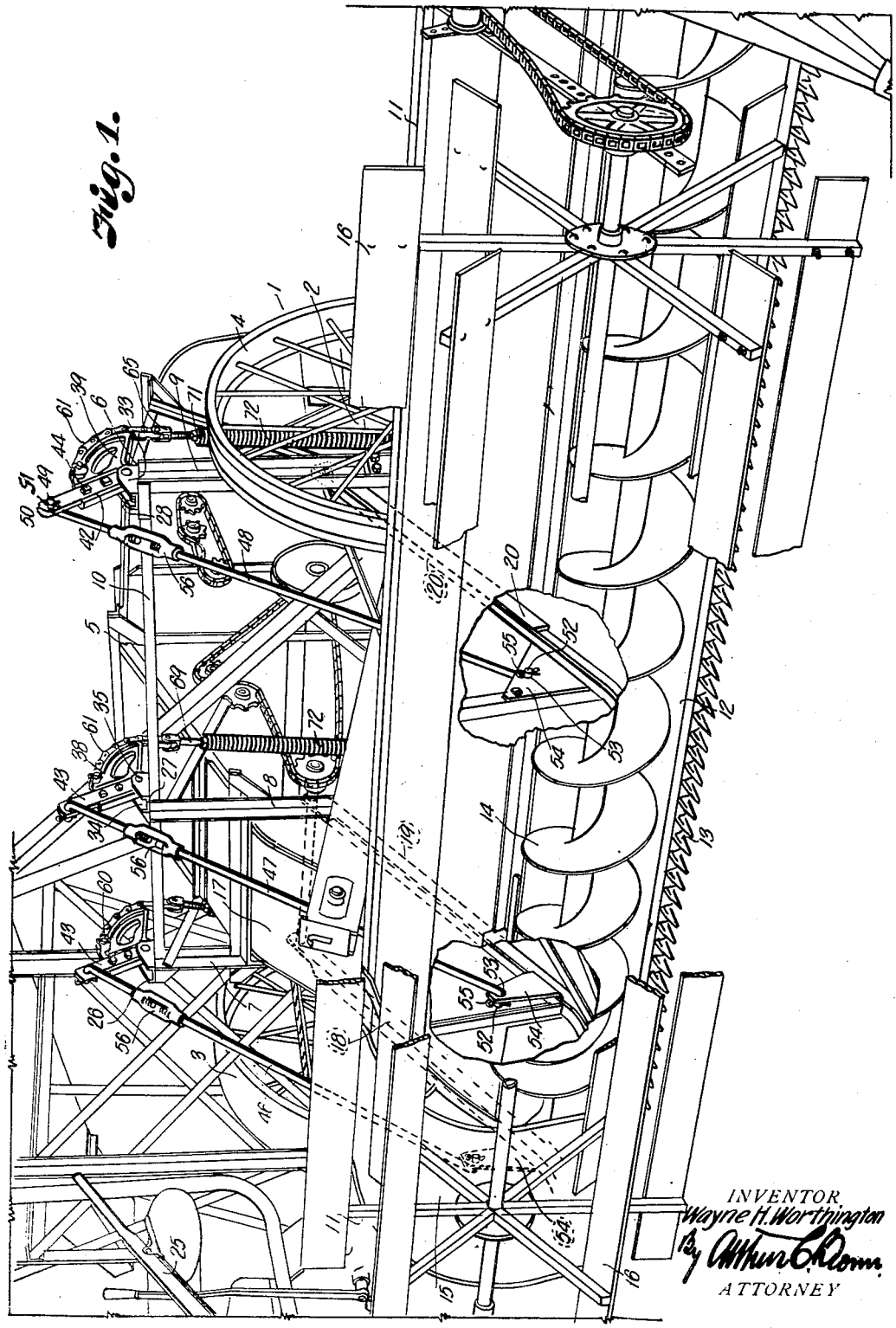
Fig. 1 is a perspective view of a combined harvester, separator and thresher embodying my invention.

Referring more in detail to the drawings:

1 designates a combined harvester, thresher and separator, including a main frame 2 supported by a bull wheel 3, an axially aligning grain wheel 4, and a usual front truck (not shown) ahead of the bull wheel 3. The main frame 2 carries the separator mechanism indicated by the housing 5, and projecting upwardly from the main frame is a vertical framework 6 comprising vertical posts 7 and 8 at opposite sides of the separator, and a post 9 projecting upwardly from the main frame adjacent the grain wheel 4. Connecting the tops of the posts is a horizontally positioned inverted channel 10 for bracing the posts and for mounting the balancing mechanism, later described.

The harvesting mechanism or cutting unit 11 is supported from the framework 6 and includes a grain pan 12 carrying a sickle bar 13 on its forward edge. Extending longitudinally in the grain pan is a conveyor 14 for feeding grain cut by the sickle into a threshing cylinder indicated by the housing 15 formed integrally with the end of the grain pan. Also supported from the grain pan is the usual reel 16 for directing the grain into engagement with the sickle bar.

Also carried by the unit is a conveyor housing 17 for conducting threshed grain into the separator housing 5. The harvesting unit thus described is pivotally supported from the vertical frame 6 by arms 18, 19 and 20 which are connected with the grain pan and pivoted to the posts 7, 8 and 9, respectively, so that the cutting unit may be raised or lowered with relation to the height of grain being cut.

To regulate the height of the unit, a ratchet wheel 21 is mounted on the main frame and is provided with an arm 22 which is connected with an ear 23 at the end of the grain pan by a link 24 so that when the ratchet wheel 21 is operated by a manually operated lever 25, the cutting mechanism is raised or lowered in an arc from the fulcrum of the arms 18, 19 and 20.

With the construction thus far described, it is apparent that the operator, in order to regulate the cutting unit, must bodily lift the unit through the lever 25, and that the power required to lift the unit varies in proportion to shifting of the center of gravity of the unit to and from the fulcrum of its pivotal mounting, and in order to assist the operator the cutting unit is usually balanced by springs connecting the forward ends of the arms with the upper ends of the posts 7, 8 and 9, the springs being tensioned to assist the operator in lifting the unit.

From Fig. 5 wherein the line O—A represents one of the arms 18, 19 or 20, and A—B the spring, it is apparent that tension of the springs varies during travel of the unit, that is, extension of the springs becomes less as the arms are raised on their pivot point O toward the dotted position A'—O, and leverage indicated by the line C—O becomes greater, and also center of gravity shifts as indicated by the vertical lines D—E and D'—E'. Thus varying degrees of power are required to move the lever 25 to compensate for these variables, requiring skill on the part of the operator to smoothly regulate the cutting unit with relation to the varying height of the grain being cut.

As before stated, it is the purpose of this invention to provide for balancing the cutting unit regardless of its position and to accomplish this purpose, I provide a balancing mechanism, as now described.

Fixed to the upper face of the channel 10, adjacent each of the posts 7, 8 and 9, are channel-shaped brackets 26 having horizontal webs 27 for securing the brackets to the channel by a bolt 28 extending through the web and the channel, and a bolt 29 extending through the web and an angle 30 riveted to the rear leg 31 of the channel, as at 32. Projecting upwardly at the sides of the web 27 are angle-shaped bearing supporting ears 33 and 34 provided with aligning openings for receiving a pivot pin 35 which is retained by a head 36 on one end of the pin, and a cotter pin 37 extending through the end of the pin, as illustrated in Fig. 4.

Pivotally mounted on the pin 35 is a compensating member 38 including a cam-shaped segment 39 projecting rearwardly of the bracket and provided with a cam face 40 carrying sprocket teeth 41.

Received in a socket 42 in the segment opposite to the cam face 40 is a bar-shaped arm 43 extending radially from the pivotal mounting of the cam and secured therein by bolts 44 extending through the arm and the head, as shown in Fig. 3.

The pivot pin 35 projects through aligning openings in the segment and in the end of the arm 43, and the segment is spaced between the ears 33 and 34 of the brackets by an integral hub 45 extending from one side thereof, which also provides an extended bearing on the pivot pin.

Connected with the free ends of the arms 43 and with the forward ends of the arms 18, 19 and 20 are connecting links 46, 47 and 48. The upper ends of the links are preferably provided with laterally extending hook-shaped portions 49 received in openings 50 formed in the ends of the arms 43, and the hook portions 49 are retained therein by cotter pins 51 extending through the hook portions, as best shown in Figs. 3 and 4. The lower ends of the links are provided with similar hook portions 52 extending through openings 53 formed in plates 54 attached to the arms 18, 19 and 20, as illustrated in Fig. 1, the hook portions being retained by cotter pins 55.

In order to adjust length of the connecting links they may be provided with turn-buckles 56 so that the position of the cutting unit or grain pan may be adjusted with relation to position of the arms 43.

Formed in each member 39 rearwardly of the arm 43 is a socket 57 and extending through spaced ears 58 and 59 forming the socket, is a pin 60 for securing the end of a sprocket chain 61 adapted to operate on the cam face 40, and teeth 41 of the head 39. The chain 61 preferably comprises a series of links 62 connected by pins 63 extending through cylindrical cross members 64. Fixed to the lower link of the chain is a yoke member 65 having spaced ears 66 received between the links, and a connecting bar portion 67 having an opening 68 for receiving a depending bolt 69. The bolt 69 is provided at its upper end with a head 70 for engaging the upper face of the connecting portion 67 of the yoke, and the lower end of the bolt is threaded to receive a threaded nut 71 thereon.

Fixed to each of the nuts 71 is the upper end of a coil spring 72 which extends downwardly to adjacent the lower end of the post 7, 8 or 9, and is attached to an angle 73 secured to a lateral channel 74 of the main frame. The lower end of each of the springs is preferably provided with a member 75 similar to the nut 71, and having a cylinder bore to receive a rod 76, a hooked end 77 received in an opening 78 in a flange of the angles 73. The upper end of the rod extends through a sleeve 79 engaging the upper end of the member 75 and the end of the rod is riveted over as at 80. Tension of the springs can be regulated by turning the springs on the bolts 69 and the rods 76 to effect adjustment of the nuts on the bolts.

The springs 72 are adapted to support the cutting unit through the lever members 39 and connecting links 46, 47 and 48, and as the supporting links are spaced across the length of the cutting unit each spring is required to support only a part of the cutting unit and the lifting force is thus distributed throughout the length thereof, reducing torsional strains that may cause sagging of the grain pan and interference with smooth operation of the cutter bar.

The cams 39 are so shaped that the leverage exerted by the cams and the arms 14 compensates for the varying factors above referred to, as is illustrated in Fig. 6.

In Fig. 6 it is apparent that as the variable C—O increases, as the cutting unit raises, the variable F—G for the arms 43 reduces to help compensate for the variable C—O, and the variable D—O caused by the shifting of the center of gravity of the cutting unit.

Thus it is apparent that weight of the cutting mechanism is balanced through all of its positions and that the lever 25 may be manipulated uniformly throughout its travel and that the cutting mechanism may be easily operated so that it can be quickly adjusted to the grain being cut.

While I have illustrated my invention as applied to a combined harvesting, threshing and separating machine, it is apparent that it may be applied to windrow or harvester headers and similar machines, and I do not wish to be limited to the particular type of machine here illustrated.

What I claim and desire to secure by Letters Patent is:

1. In a machine of the character described including a main frame and a cutting unit pivotally supported on the main frame and arranged to move on the arc of a circle, means for balancing the cutting unit comprising a compensating member pivoted on the main frame and having a cam face, a flexible member operable over the cam face and having one end fixed to the compensating member, a spring connected with the main frame and with the other end of the flexible member, a leverage compensating arm associated with the compensating member, and a link connecting the leverage compensating arm with the cutting unit and arranged to move to and from the pivot point of said compensating member for varying the effective leverage of said compensating lever proportionate to shifting of the center of gravity of the cutting unit during its arcuate movement.

2. In a machine of the character described including a main frame and a cutting unit pivoted on the main frame and arranged to move in an arc of a circle, means for balancing the cutting unit comprising a compensating member pivoted on the main frame and having a cam face, variable tension means connected with the main frame, a flexible member operable over the cam face and connected with said tension means, a separate compensating lever associated with the compensating member, and means connecting the free end of the lever with the cutting unit and arranged to move to and from the pivot point of said compensating member to vary the effective leverage of said compensating lever upon shifting of the center of gravity of the cutting unit.

3. In a machine of the character described including a main frame and a cutting unit pivoted on the main frame and arranged to move in an arc of a circle, means for balancing the cutting unit comprising a compensating member pivoted on the main frame including a toothed cam-shaped segment, a chain operable over the teeth of the segment, a balancing spring connecting the chain with the main frame, a separate compensating lever fixed to the segment, and means connecting the compensating lever with the cutting unit arranged to move to and from the pivot point of said compensating member to vary the effective leverage of said compensating lever to compensate for the shifting of center of gravity of the cutting unit as it moves to and from its pivot point.

4. In a machine of the character described including a main frame and a cutting unit, a vertically supported framework on the main frame, spaced arms pivotally connected with the vertical framework and attached to the cutting unit, cam-shaped members rockingly mounted on said framework in substantial alignment with the arms, lever arms extending radially from the pivot point of said cam-shaped members, rods pivotally connecting the ends of the arms adjacent the cutting unit with the ends of the lever arms and arranged so that the rods move to and from the pivot point of the compensating members upon movement of the cutting unit to vary the effective leverage of said arms during shifting of center of gravity of the cutting unit when it is pivoted on the main frame, flexible members operable over the cam members, springs connecting the flexible members to the main frame for supporting the cutting unit, and means for adjusting tension of the springs.

5. In a machine of the character described including a main frame, a harvesting unit pivoted on the main frame and arranged to move through an arc of a circle, springs for balancing the harvesting unit, means for compensating tension of the spring, and separate means operable upon actuation of the spring compensating means for compensating variation in leverages upon shifting of the center of gravity of the harvesting unit as it moves through said arc.

6. In a machine of the character described including a main frame, a harvesting unit adjustably supported by the main frame and arranged to move through an arc of a circle, spaced posts supported by the main frame, arms attached to the unit and pivoted to the posts, springs connected with the main frame, means for compensating tension of the springs, and separate means for compensating variation in leverages as the center of gravity of the unit shifts to and from the pivot point of said arms during adjustment of the cutting unit.

7. In a machine of the character described including a main frame, a cutting unit pivoted on the main frame, means for balancing the cutting unit with relation to the main frame comprising a spring compensating lever pivoted on the main frame, a spring operably associated with the compensating lever and connected with the main frame, a separate compensating lever operably connected with the first named lever, and a rod having one end pivotally connected with the last named compensating lever and with the cutting unit for supporting the cutting unit and arranged to move to and from the pivot point of the spring compensating lever to vary the effective leverage of said second compensating lever to compensate for change of levers due to shifting of center of gravity of the cutting unit.

In testimony whereof I affix my signature.

WAYNE H. WORTHINGTON.